(12) United States Patent   (10) Patent No.: US 7,134,604 B2
Sato                        (45) Date of Patent:     Nov. 14, 2006

(54) NON-CONTACT IC CARD

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 255 days.

(21) Appl. No.: 10/633,661

(22) Filed: Aug. 5, 2003

(65) Prior Publication Data

US 2004/0031857 A1   Feb. 19, 2004

(30) Foreign Application Priority Data

Aug. 15, 2002 (JP) ............................. 2002-236944

(51) Int. Cl.
*G06K 19/06* (2006.01)

(52) U.S. Cl. ....................... 235/492; 235/493; 235/451; 235/453

(58) Field of Classification Search ................ 235/492, 235/380, 382.5; 380/227–230; 713/172, 713/185; 705/65–69
See application file for complete search history.

(56) References Cited

U.S. PATENT DOCUMENTS

| 4,794,236 | A  | * | 12/1988 | Kawana et al. ............. 235/441 |
| 5,623,637 | A  | * | 4/1997  | Jones et al. ................. 711/164 |
| 5,629,981 | A  | * | 5/1997  | Nerlikar ...................... 713/168 |
| 5,734,154 | A  | * | 3/1998  | Jachimowicz et al. ...... 235/492 |
| 5,859,419 | A  | * | 1/1999  | Wynn .......................... 235/487 |
| 6,230,267 | B1 | * | 5/2001  | Richards et al. ............ 713/172 |
| 6,253,999 | B1 | * | 7/2001  | Yamamoto et al. ......... 235/380 |
| 6,385,723 | B1 | * | 5/2002  | Richards ...................... 713/160 |
| 6,411,199 | B1 | * | 6/2002  | Geiszler et al. ............. 340/10.1 |
| 6,466,671 | B1 | * | 10/2002 | Maillard et al. ............. 380/227 |
| 6,484,260 | B1 | * | 11/2002 | Scott et al. .................. 713/186 |
| 6,616,054 | B1 | * | 9/2003  | Norton ......................... 235/492 |
| 6,690,556 | B1 | * | 2/2004  | Smola et al. .................. 361/56 |
| 6,704,608 | B1 | * | 3/2004  | Azuma .......................... 700/66 |
| 6,792,536 | B1 | * | 9/2004  | Teppler ....................... 713/178 |
| 6,814,295 | B1 | * | 11/2004 | Posch et al. ................. 235/492 |
| 6,886,753 | B1 | * | 5/2005  | Azuma ......................... 235/492 |
| 6,895,502 | B1 | * | 5/2005  | Fraser ......................... 713/168 |
| 2003/0005321 | A1 | * | 1/2003 | Fujioka ....................... 713/193 |
| 2003/0024994 | A1 | * | 2/2003 | Ladyansky .................. 235/492 |
| 2003/0150915 | A1 | * | 8/2003 | Reece .......................... 235/449 |

* cited by examiner

*Primary Examiner*—Kimberly D. Nguyen
(74) *Attorney, Agent, or Firm*—Oblon, Spivak, McClelland, Maier & Neustadt, P.C.

(57) ABSTRACT

In a non-contact IC card for performing communication with a reader/writer, an encryption block having a DES (data encryption standard) block for performing an encryption operation in accordance with a public key encryption algorithm and an ECC/SHA1 (elliptic curve cryptosystem/secure hash algorithm 1) block for performing an encryption operation in accordance with a common key encryption algorithm are incorporated into an IC chip. A CPU having a built-in clock gear causes a change of the operation frequency of the non-contact IC card. The communication operation with the reader/writer and the encryption operations performed by the encryption block are performed at different operation frequencies.

12 Claims, 8 Drawing Sheets

NON-CONTACT IC CARD

BACKGROUND OF THE INVENTION

1. Field of the Invention

The present invention relates to a non-contact IC card capable of non-contact data communication with readers/writers.

2. Description of the Related Art

Recently, a variety of services using various communication technologies, such as electronic commerce or on-line shopping over the Internet or the like, have become popular. With the growth of communication technologies, terminal-based communication systems and card-like devices including non-contact semiconductor memory cards having a communication function integrated into a circuit (these devices are hereinafter referred to as non-contact IC (integrated circuit) cards) have been developed for use in various situations such as electronic toll collection of transportation facilities and electronic money transactions. In view of their convenience of handling, the non-contact IC cards must have a reduced circuit size and operate with very low power consumption.

The services using such non-contact IC cards generally require mutual authentication to authenticate the communicating parties and encryption to ensure data communication security. These functions must be performed at high speed in the non-contact IC cards. These functions, which are implemented by software, require a high-clock CPU (central processing unit), which is not suitable for practical use. Therefore, it is desirable that the mutual authentication function and the encryption function be implemented in the non-contact IC cards by hardware rather than software.

Most of the non-contact IC cards in which these functions are implemented by hardware employ so-called common key encryption algorithms, e.g., DES (data encryption standard), to reduce the consumption power because relatively reduced circuit size and power consumption of the non-contact IC cards are achievable. Some of the non-contact IC cards which employ the common key encryption algorithms typically have a communication distance of several centimeters to a reader/writer. Even a communication distance of as much as 10 cm can be realized, depending upon the type of interface.

However, in the common key encryption algorithms, a common key is used for both encoding and decoding, and so transmission and reception of key data are essential. Therefore, the common key encryption algorithms are vulnerable to attacks from unauthorized third parties. This has led to fears that the non-contact IC cards applied to financial services in the future may have problems.

In the services using non-contact IC cards, therefore, the demands for high security systems using so-called public key encryption algorithms, e.g., RSA (Rivest-Shamir-Adleman) and ECC (elliptic curve cryptosystem), have increased. In public key encryption, separate keys are used for encoding and decoding and a secret common key is kept by one particular individual. Many studies on non-contact IC cards for performing signature generation and authentication using public key techniques have been made.

Public key encryption algorithms have higher security than common key encryption algorithms, but require a large amount of calculation. Public key encryption algorithms implemented by hardware require circuits several tens of times larger than otherwise and also require a large amount of power supplied to such large circuits.

In the art, non-contact IC cards using the public key encryption algorithms have not achieved the desired characteristics in terms of circuit size, power consumption, and cost. In the current non-contact IC cards, most of the power must be supplied to an encryption circuit, and the communication distance is as small as about several millimeters.

Although the demands for non-contact IC cards using public key encryption algorithms having high security robustness have increased, it is difficult to implement the algorithms because such non-contact IC cards have limitations on power supply, chip size, etc., and the small communication distance is not suitable for practical use.

SUMMARY OF THE INVENTION

Accordingly, it is an object of the present invention to provide a non-contact IC card having a sufficient communication distance during a public key encryption operation and using both a common key encryption algorithm and a public key encryption algorithm so as to be applied to a variety of services.

According to the present invention, a non-contact IC card for communicating data with a reader/writer in a contactless manner includes an encryption unit having a public key encryption processor for performing a public key encryption operation, and a common key encryption processor for performing a common key encryption operation; and a frequency controller for changing the operation frequency of the non-contact IC card so that communication with the reader/writer and the encryption processes performed by the encryption unit are carried out at different operation frequencies.

In the non-contact IC card according to the present invention, the communication operation and the encryption operations are carried out at different operation frequencies. For example, the encryption unit is activated at a lower operation frequency to perform encryption. This reduces the instantaneous power for encryption, thus reducing the consumption power of the non-contact IC card. According to the present invention, therefore, even if the non-contact IC card employs a public key encryption algorithm, more power is available for communication with a reader/writer to ensure a sufficient communication distance. The non-contact IC card easily realizes a two-way card using both a common key encryption algorithm and a public key encryption algorithm.

In the non-contact IC card according to the present invention, preferably, hardware of the encryption unit which is not required for the public key encryption operation is not operated during the public key encryption operation, and hardware of the encryption unit which is not required for the common key encryption operation is not operated during the common key encryption operation. In the non-contact IC card of the present invention, a hardware unit having an identical function may be shared between the public key encryption processor and the common key encryption processor, and the shared hardware unit may be switched in a time-shared manner according to the operation mode.

In the non-contact IC card according to the present invention, the hardware not required for each operation is not operated, and a hardware unit is shared and is switched in a time-shared manner. The shared hardware configuration with operation of only the required hardware reduces the circuit size, thus reducing the power consumption. Consequently, the non-contact IC card easily realizes a two-way card.

BRIEF DESCRIPTION OF THE DRAWINGS

FIGS. 5A through 5D are block diagrams for illustrating the time-shared processing of the non-contact IC card, in which FIG. 5A shows the operation in a communication mode, FIG. 5B shows the operation in a DES mode, FIG. 5C shows the operation in an ECC mode, and FIG. 5D shows the operation in an ALU RAM mode;

DESCRIPTION OF THE PREFERRED EMBODIMENTS

A specific embodiment of a non-contact IC card according to the present invention is described in detail with reference to the drawings.

Figure 1A:
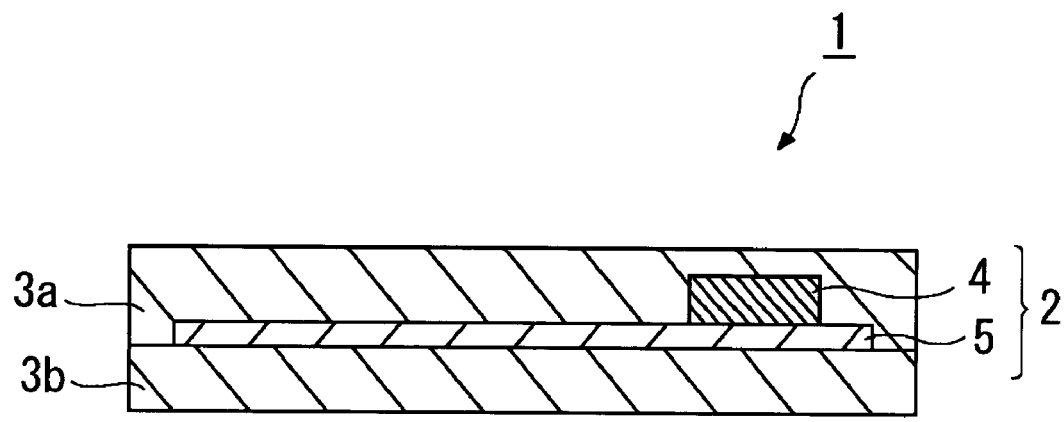
FIGS. 1A and 1B are a longitudinal cross-sectional view and a plan view of a non-contact IC card according to an embodiment of the present invention, respectively.
Figure 1B:
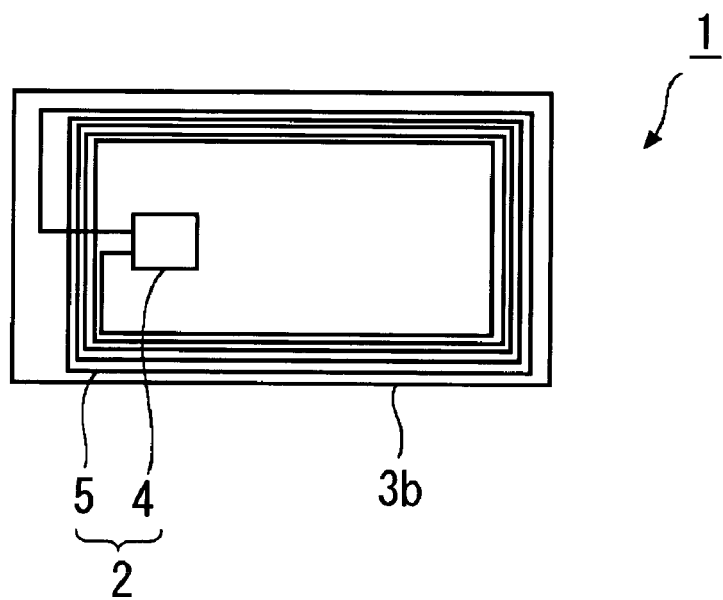

Referring to FIG. 1A, a non-contact IC card 1 includes an IC module 2 sandwiched between a pair of thermoplastic resin sheets 3a and 3b. As shown in FIG. 1B, the IC module 2 includes an IC chip 4 having an encryption unit, and an antenna circuit 5, such as an antenna coil, connected with the IC chip 4 to communicate data with a reader/writer. A protection layer made of resin such as PVC may be formed on a surface of each of the thermoplastic resin sheets 3a and 3b.

The non-contact IC card 1 may be a non-contact semiconductor memory card having a communication function integrated into a circuit. In the non-contact IC card 1, a mutual authentication function for authenticating the communicating parties and an encryption function for ensuring data communication security are implemented by hardware (the IC chip 4) serving as an encryption unit. The non-contact IC card 1 employs both a common key encryption algorithm and a public key encryption algorithm, and these encryption algorithms are used depending upon the service to be provided. Either the common key encryption algorithm or the public key encryption algorithm is used in the non-contact IC card 1 based on header information etc. of received data.

In the non-contact IC card 1, hardware for performing various operations including communication with a reader/writer is shared on the IC chip 4, and the operations are performed in a time-shared manner. In the following description, the DES (data encryption standard) technique is used as the common key encryption algorithm and the elliptic curve cryptosystem (ECC) technique is used as the public key encryption algorithm. In the following description, furthermore, the SHA-1 (Secure Hash Algorithm 1) technique is used as the hash function algorithm to be used for authentication or digital signature in the public key encryption algorithm, and the DES technique is used as the random number generation technique for use in key generation during public key encryption. Therefore, the non-contact IC card 1 performs common key encryption signal processing using the DES technique, and also performs public key encryption signal processing using at least the ECC, SHA-1, and DES techniques.

The concept of shared hardware configuration of the non-contact IC card 1 among the DES, ECC, and SHA-1 operations is described below.

Figure 2A:
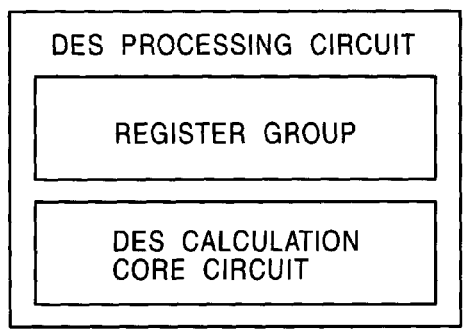
FIGS. 2A through 2D are block diagrams showing the concept of an encryption mechanism in an IC chip.
Figure 2B:
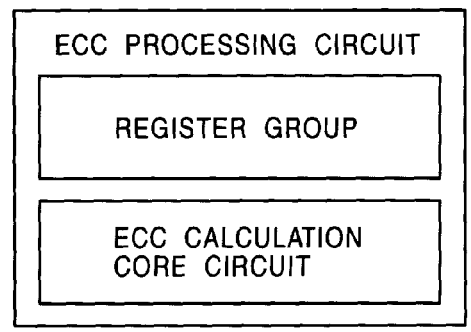
Figure 2C:
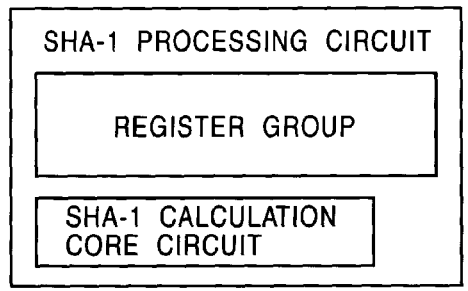
Figure 2D:
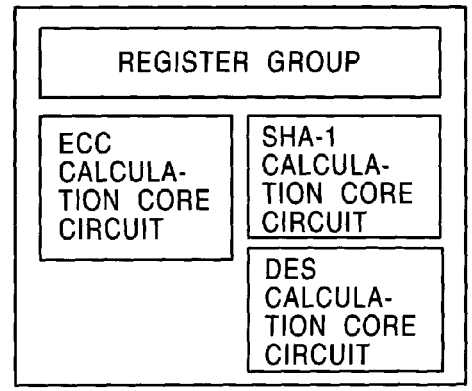

In the non-contact IC card 1, a register group as hardware is shared on the IC chip 4 among the DES, ECC, and SHA-1 operations. FIG. 2A shows the concept of a DES engine (DES processing circuit) for performing DES for common key encryption or for random number generation in public key encryption. In FIG. 2A, the DES engine is formed of a register group and a DES calculation core circuit as functional units of hardware. FIG. 2B shows the concept of an ECC engine (ECC processing circuit); the ECC engine is formed of a register group and an ECC calculation core circuit as functional hardware units. FIG. 2C shows the concept of an SHA-1 engine (SHA-1 processing circuit); the SHA-1 engine is formed of a register group and an SHA-1 calculation core circuit as functional hardware units. As shown in FIGS. 2A through 2C, approximately half of the hardware for each encryption operation corresponds to the register group. FIG. 2D shows the concept of shared hardware configuration, in which a register group is shared among the DES, ECC, and SHA-1 operations. This reduces the circuit size of the encryption unit in the IC chip 4.

In the non-contact IC card 1, the SHA-1 calculation core circuit and the ECC calculation core circuit may also be shared. The SHA-1 calculation core circuit requires a high-speed adder to determine hash values. The ECC calculation core circuit also includes an adder. Therefore, multiple-gate hardware, such as an adder, is shared between the SHA-1 calculation core circuit and the ECC calculation core circuit. This reduces the circuit size of the encryption unit in the IC chip 4.

In the non-contact IC card 1, bus switches of the encryption engines are also used as switches for switching other functions. In the public key encryption algorithm, a bus must be switched to make the key length variable, and the ECC engine includes multiple switches having a bit width of, for example, 32. The switches can be shared between the SHA-1 hardware and the DES hardware in view of their structure. The non-contact IC card 1 uses the bus switches as switches for switching other functions. This reduces the circuit size of the encryption unit in the IC chip 4.

In the non-contact IC card 1, the hardware on the IC chip 4, such as the above-described register and a memory, may also be time-shared. In the non-contact IC card 1, signal processing according to the common key encryption technique or the public key encryption technique is performed after communication with a reader/writer, although the communication and signal processing operations cannot be concurrently performed. Thus, time-shared processing is essential to hardware sharing. Using this principle, hardware, such as the register and the memory, is time-shared between the operations. The time-shared processing of the non-contact IC card 1 with the shared hardware configuration is described below.

Figure 3:
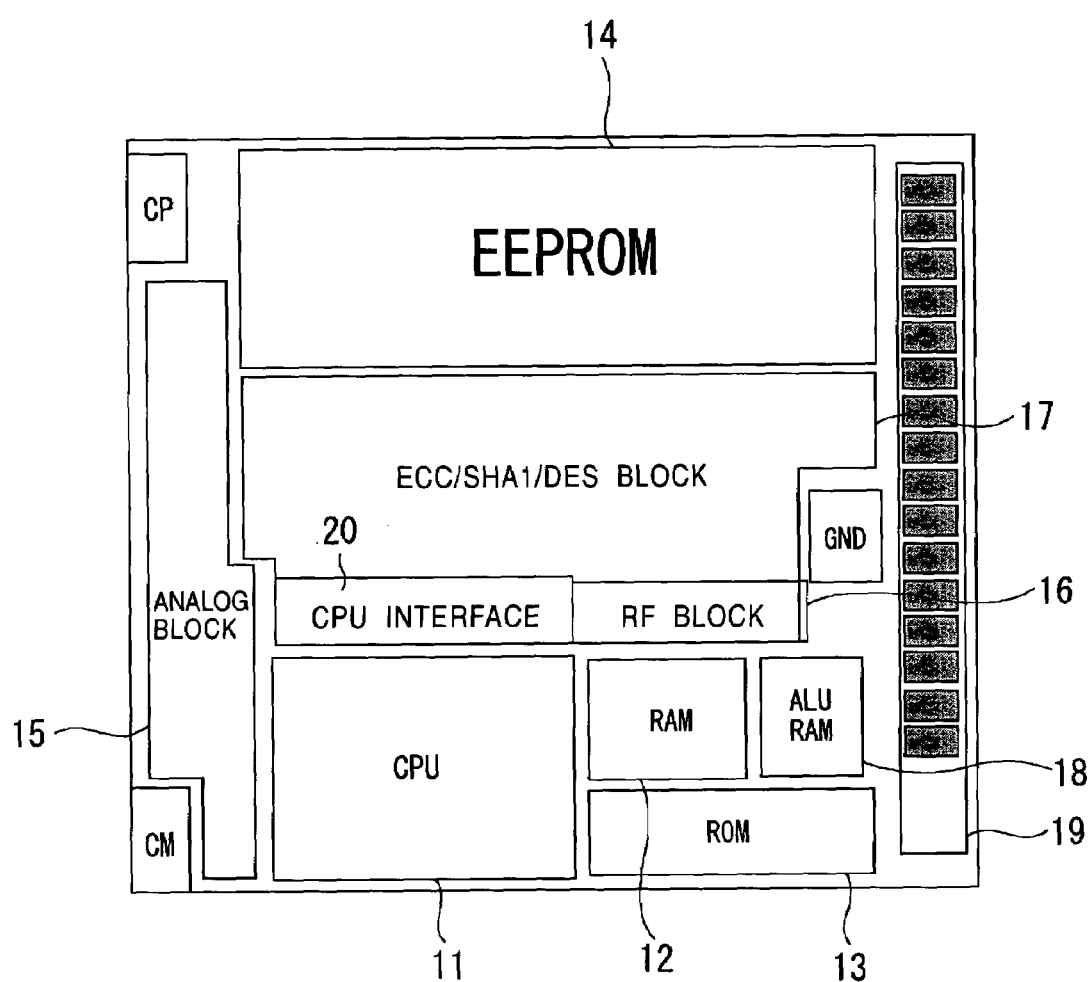
FIG. 3 is a block diagram of the IC chip of the non-contact IC card.

FIG. 3 is a block diagram of the IC chip 4 of the non-contact IC card 1. The IC chip 4 includes a CPU 11 for controlling the components of the IC chip 4, a RAM (random access memory) 12 serving as a work area of the CPU 11 and having a capacity of, for example, about 2 KB, a ROM (read-only memory) 13 having a capacity of, for example, about 32 KB for storing various programs etc., an EEPROM (electrically erasable programmable read-only memory) 14 having a capacity of, for example, about 9 KB, an analog block 15 including a power supply circuit etc., an RF (radio-frequency) block 16 connected with the antenna circuit 5 for performing wireless communication, an ECC/SHA1/DES block 17 serving as an encryption block for performing the DES, ECC, and SHA-1 operations, an ALU RAM (arithmetic and logical unit random access memory) 18 having a capacity of, for example, about 1 KB for storing hash values, a test block 19 having lands used as a tester, and a CPU interface 20 which is a bus through which data is transmitted and received between the CPU 11 and each component. These components of the IC chip 4 are formed into an integrated circuit.

The non-contact IC card 1 having the IC chip 4 activates the ECC/SHA1/DES block 17 under the control of the CPU 11 to perform DES for common key encryption and to perform ECC, SHA-1, and DES for public key encryption. The non-contact IC card 1 generally has four operation modes, i.e., a communication mode for communication with a reader/writer, an ECC mode for ECC processing, a DES mode for DES processing, and an ALU-RAM mode for accessing the ALU RAM 18. Depending upon the operation mode, the required hardware is switched in a time-shared manner.

Figure 4:
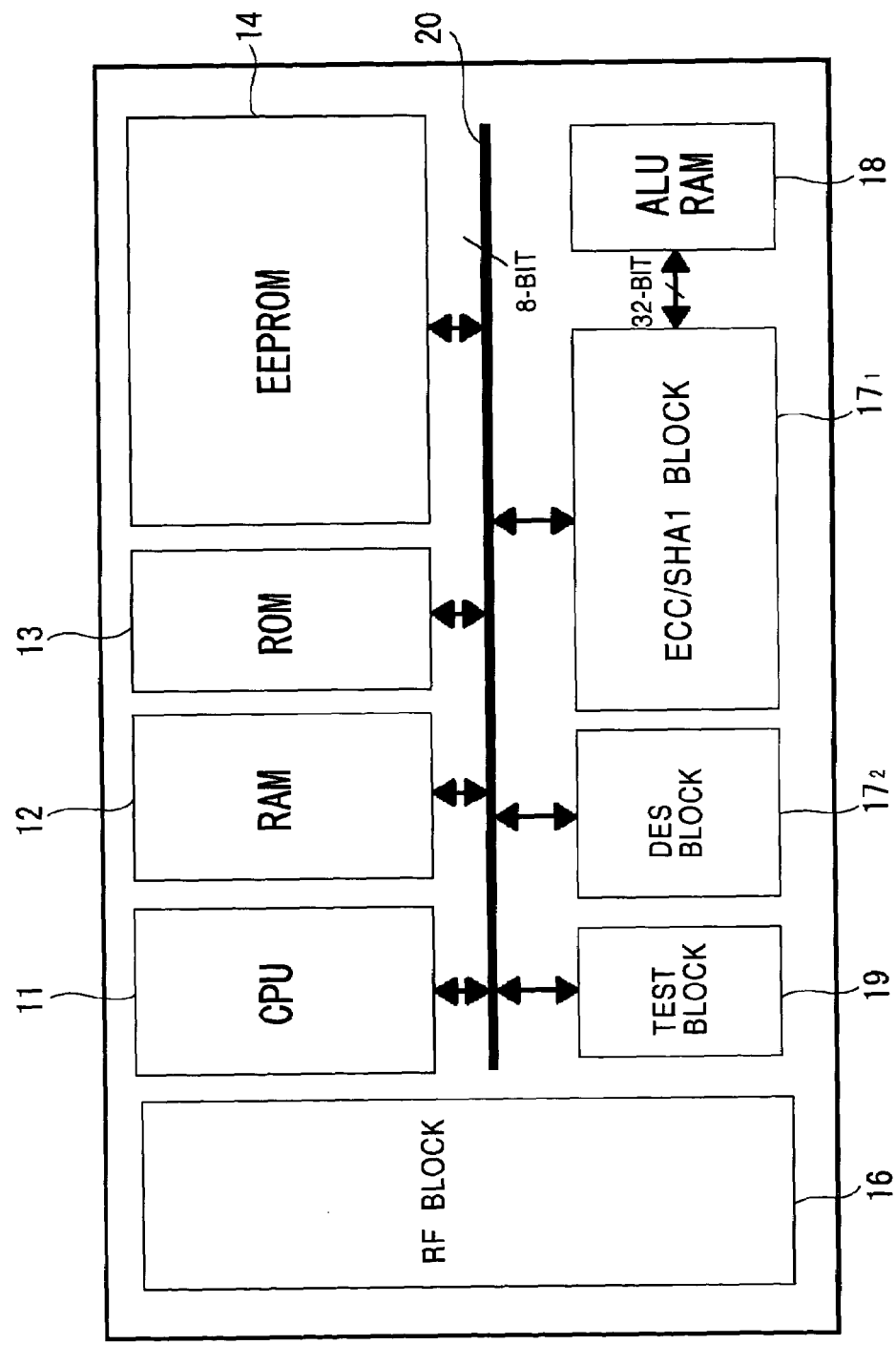
FIG. 4 is a block diagram showing functions of the IC chip of the non-contact IC card.

The time-shared processing of the non-contact IC card 1 is specifically described with reference to FIG. 4, which shows the functions of the components of the IC chip 4. In FIG. 4, the analog block 15 is not shown, and the ECC/SHA1/DES block 17 is divided into an ECC/SHA1 block $17_1$ having the ECC and SHA-1 functions and a DES block $17_2$ having the DES function, in order to aid understanding.

Figure 5C:
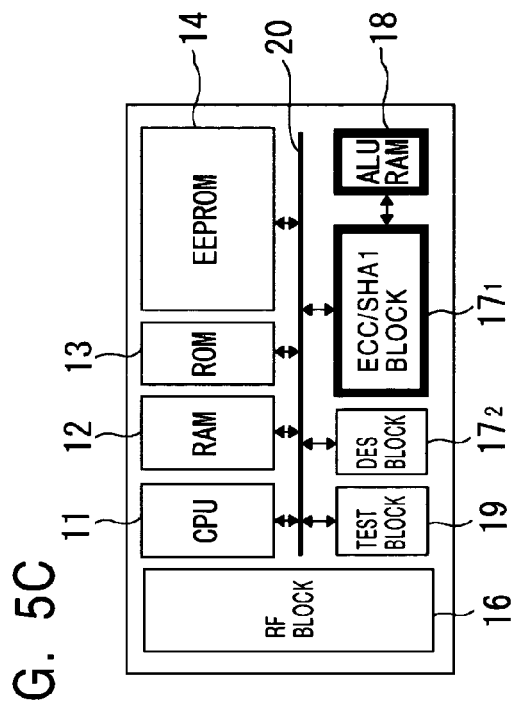
Figure 5D:
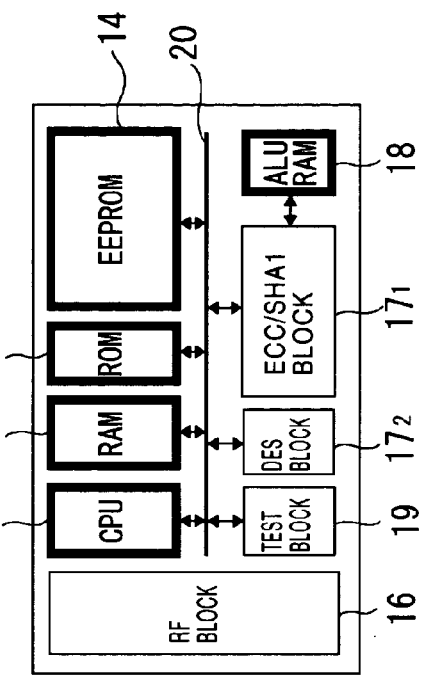
Figure 5A:
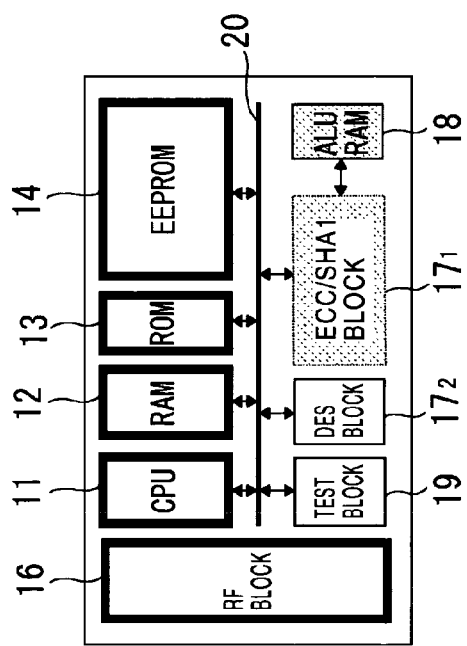

When the non-contact IC card 1 is in the communication mode, the blocks shown in FIG. 5A by thick lines, namely, the CPU 11, the RAM 12, the ROM 13, the EEPROM 14, and the RF block 16, are activated. Specifically, when the non-contact IC card 1 is in the communication mode, a predetermined communication program stored in the ROM 13 is initiated under the control of the CPU 11 to send various information stored in the RAM 12 or the EEPROM 14 to the outside via the RF block 16 and also to store various information received from the outside via the RF block 16 into the RAM 12 or the EEPROM 14. In the communication mode, the encryption blocks not required for the communication mode, namely, the ECC/SHA1 block $17_1$, the DES block $17_2$, and the ALU RAM 18, do not operate. This hardware operation in the communication mode, namely, inactivation of the encryption blocks, is achievable by sharing hardware among the operations and by performing the operations in a time-shared manner.

Figure 5B:
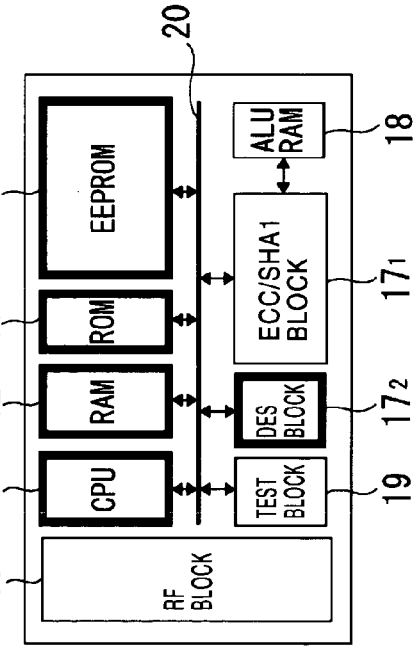

When the non-contact IC card 1 is in the DES mode, the blocks shown in FIG. 5B by thick lines, namely, the CPU 11, the RAM 12, the ROM 13, the EEPROM 14, and the DES block $17_2$, are activated. Specifically, when the non-contact IC card 1 is in the DES mode, a predetermined pseudo-random number (hereinafter referred to as PN, for short) sequence stored in the ROM 13 is read as seed or key data under the control of the CPU 11 to perform the DES operation in the DES block $17_2$ using the RAM 12 as a work area. In the DES mode, the encryption blocks not required for the DES operation, namely, the ECC/SHA1 block $17_1$ and the ALU RAM 18, do not operate. More specifically, the gates not required for the DES operation are intentionally shut down. At this time, for example, input values to public key encryption calculation units of the ECC/SHA1 block $17_1$ are held or set to "0" or "1" so that the ECC/SHA1 block $17_1$ is not operated.

When the non-contact IC card 1 is in the ECC mode, the blocks shown in FIG. 5C by thick lines, namely, the ECC/SHA1 block $17_1$ and the ALU RAM 18, are activated. Specifically, when the non-contact IC card 1 is in the ECC mode, the SHA-1 operation is performed in the ECC/SHA1 block $17_1$ to generate hash values, and the hash values are stored in the ALU RAM 18. Also in the ECC mode, the hash values are read from the ALU RAM 18 and are used for ECC processing of the ECC/SHA1 block $17_1$. In the ECC mode, the encryption block not required for the ECC operation, namely, the DES block $17_2$, does not operate. More specifically, the gates not required for the ECC operation are intentionally shut down.

When the non-contact IC card 1 is in the ALU-RAM mode, the blocks shown in FIG. 5D by thick lines, namely, the CPU 11, the RAM 12, the ROM 13, the EEPROM 14, and the ALU RAM 18, are activated. Specifically, when the non-contact IC card 1 is in the ALU-RAM mode, various required information stored in the ROM 13 is read under the control of the CPU 11, and the ALU RAM is accessed using the RAM 12 as a work area.

In the non-contact IC card 1, therfore, some components are shared among the SHA-1 processing circuit, the ECC processing circuit, and the DES processing circuit, and a plurality of operations which cannot be concurrently performed are performed in a time-shared manner by switching the hardware operated depending upon each operation mode in a time-shared manner while shutting down the hardware not required. This reduces the number of required gates by about one half, thus reducing the circuit size of the encryption unit in the IC chip 4. This also reduces the instantaneous power for the encryption operations, etc., by about one half. Since the shared hardware configuration reduces the number of required gates by one half, the reduction in power consumption for the non-contact IC card 1 is efficient. The reduced power consumption allows the non-contact IC card 1 to supply more power to a communication mechanism for communication with a reader/writer. Thus, the communication distance during the public key encryption operation becomes as long as the communication distance during the common key encryption operation, e.g., a communication distance of several centimeters, which is suitable for practical use. The non-contact IC card 1 which employs a public key encryption algorithm has high resistance to attacks such as tampering, and is effective for services with the high-security demands.

In the non-contact IC card 1, the time-shared operations are performed at different operation frequencies under the control of the CPU 11. The communication operation can be performed at an operation frequency supporting high-speed communication, followed by the encryption operations at a lower calculation speed or lower operation frequency. The encryption operation at a lower clock rate greatly reduces the instantaneous power for encryption, thus reducing the power consumption of the non-contact IC card 1, whereas more power is available for communication with a reader/writer to increase the communication distance, e.g., a communication distance of about ten centimeters, during the public key encryption operation.

Figure 6:
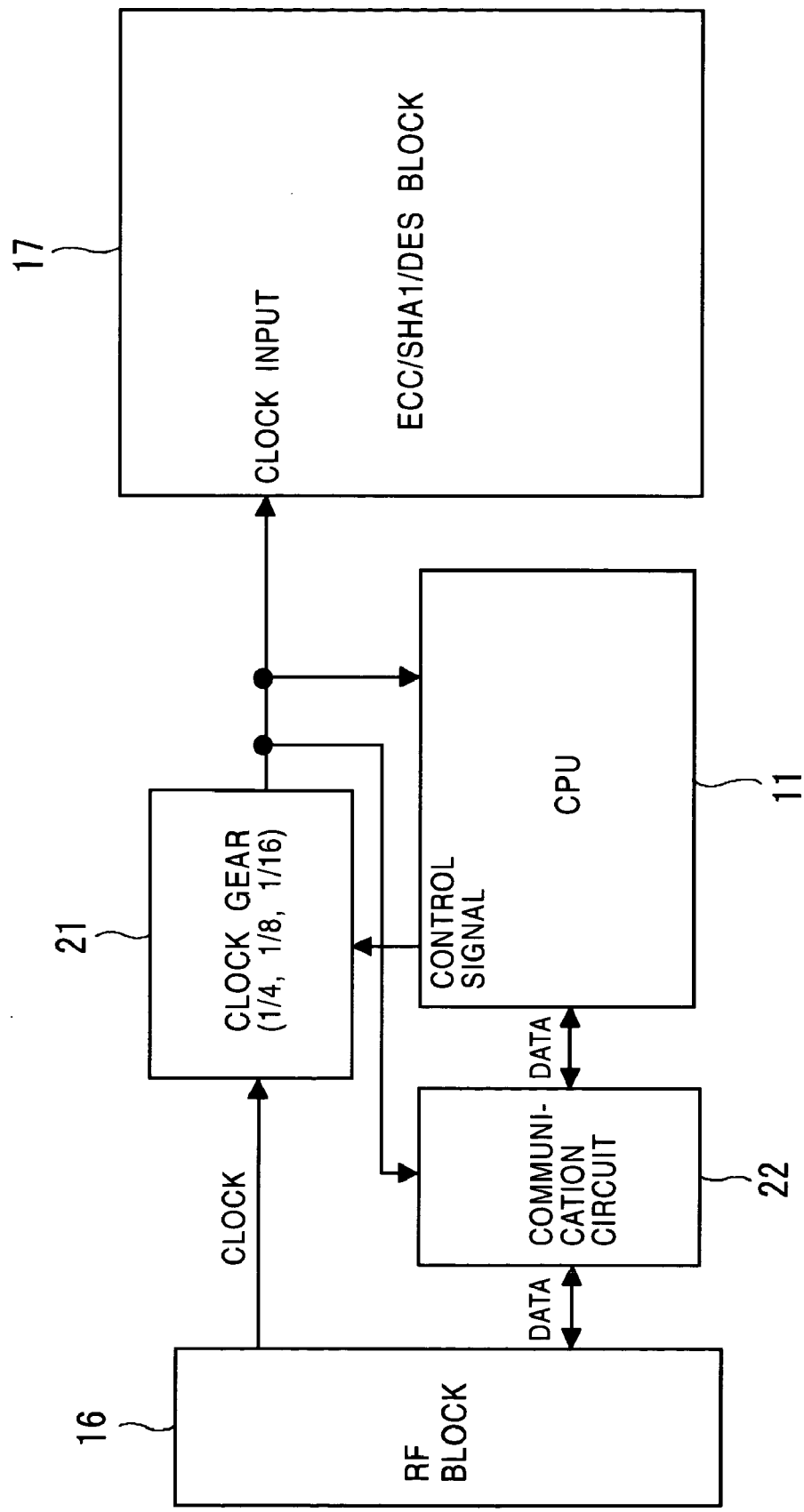
FIG. 6 is a block diagram of the non-contact IC card in which a clock gear is used to change the operation frequency.

In the non-contact IC card 1 shown in FIG. 6, the CPU 11 selects the clock division ratio using a built-in clock gear 21 to change the operation frequency. The clock gear 21 can select one of the division ratios of, for example, 1/4, 1/8, and 1/16 based on a control signal from the CPU 11, so that the encryption block, namely, the ECC/SHA1/DES block 17, is activated at different operation frequencies depending upon the encryption operation. For example, in the public key encryption operation, the division ratio of 1/4 is selected to communicate data with a reader/writer via the RF block 16 and the communication circuit 22 at the same communication rate as that in the common key encryption operation. The division ratio of 1/8 is selected to perform the public key encryption operation based on a control signal from the CPU 11. Thus, the overall consumption power can be reduced to one half. The division ratio of 1/8 requires an operation time twice as much as for the original division ratio; however, the consumption power for the encryption operation can be reduced, and more power is available for communication with a reader/writer, resulting in a communication distance as long as the communication distance in the common key encryption operation. The IC chip 4 of the non-contact IC card 1 realizes about 0.2-second signature generation for ECC 160-bit (i.e., RSA 1024-bit) keys, and is therefore suitable for practical use even with an encryption operation at a lower operation frequency. After the encryption operation, the division ratio of 1/4 is selected again based on a control signal from the CPU 11, thus realizing high-speed communication while maintaining the communication rate. In the non-contact IC card 1, therefore, an equivalent communication distance is ensured in both the common key encryption operation and the public key encryption operation without a change of the communication rate, or at a high communication speed.

In this example, the division ratio is selected only for the encryption operation. Depending upon the service to be provided, the division ratio may be reduced not only for the encryption operation but also for the communication operation to reduce the communication rate while increasing the communication distance.

In the non-contact IC card 1, the public key encryption operation may be performed at varying operation frequencies depending upon the reader/writer.

The strengths of radio waves of consumer readers/writers and licensed ones for commercial use communicating with the non-contact IC card 1 differ from each other. For example, automatic train ticket gate readers/writers ensure a sufficiently long communication distance to the non-contact IC card 1 because they use very strong radio waves. On the other hand, domestic readers/writers, which need not be licensed, use weak radio waves and thus have a small communication distance. Although commercial-use readers/writers, such as the automatic ticket gate readers/writers, require high-speed arithmetic operation, the radio-wave strength is high, as described above, resulting in a sufficiently long communication distance. Therefore, it is preferable that the clock gear 21 be controlled to select the division ratio so that the operation frequency increases for higher-speed encryption since the clock rate need not be reduced in order to ensure the desired communication distance. In contrast, domestic readers/writers have no serious problem if non-contact communication is performed with a close communication distance and if it requires a longer time for encryption. Therefore, it is preferable that the clock rate be reduced so as to reduce the consumption power and that the clock gear 21 be controlled to select the division ratio so that the operation frequency decreases. Accordingly, the clock gear 21 selects the desired division ratio depending upon the service to be provided, particularly, depending upon the reader/writer used for the service, thus allowing a single card to be used for various services in various situations including different types of readers/writers. It is necessary for a reader/writer to send beforehand a control signal for determining whether high-speed encryption or low-speed encryption should be used together with data in the communication process.

The clock gear 21 may be automatically controlled in the non-contact IC card 1. In this case, the operation frequency at which encryption is performed is determined according to a voltage of the power supply circuit, a synchronization signal during polling, or the like. However, in view of stable operation, high-speed performance, and reliability of the non-contact IC card 1, it is preferable to send a control signal from a reader/writer.

Figure 7:
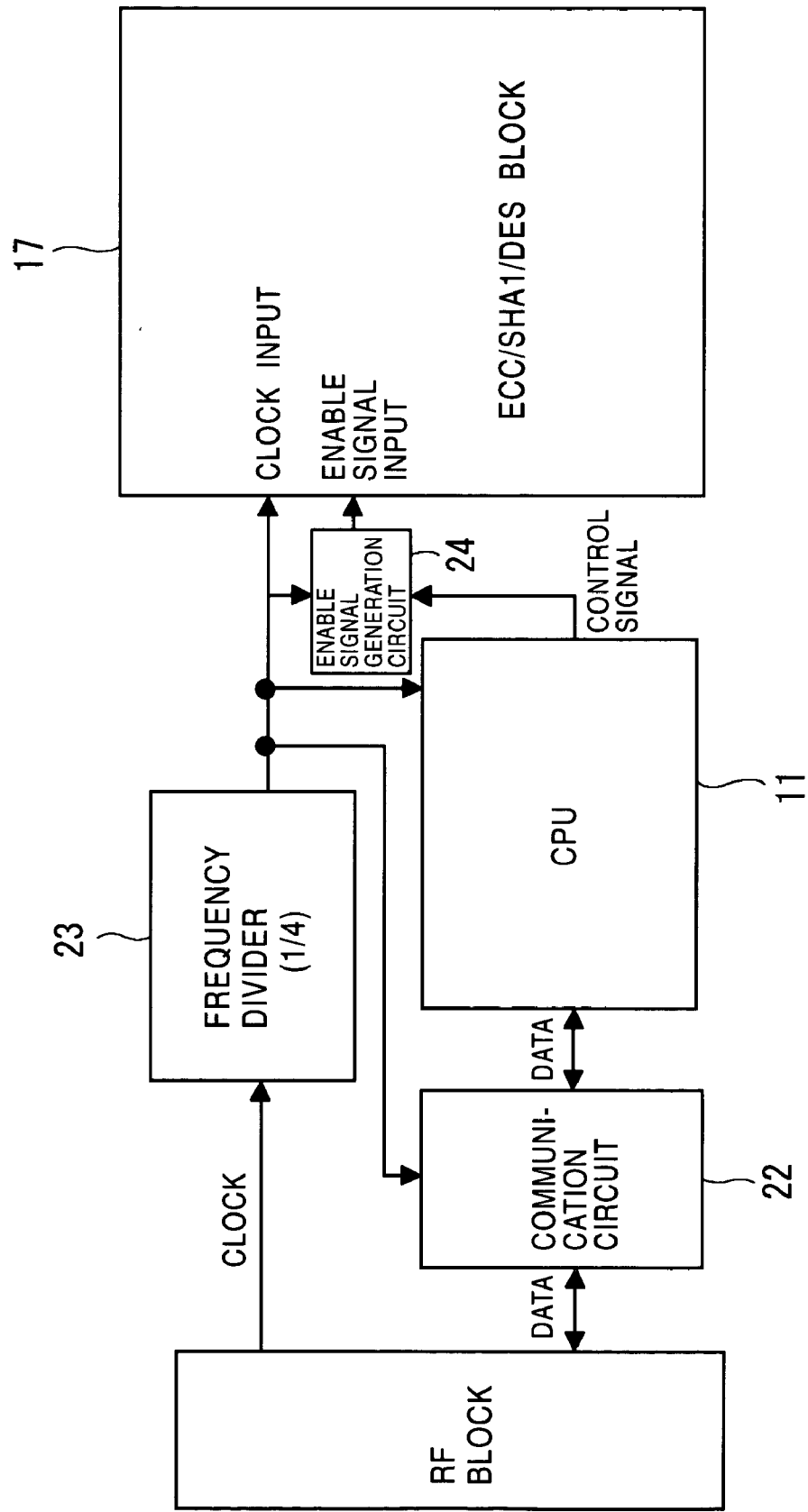
FIG. 7 is a block diagram of the non-contact IC card in which the duty factor of an enable signal is changed by an enable signal generator.
Figure 8:
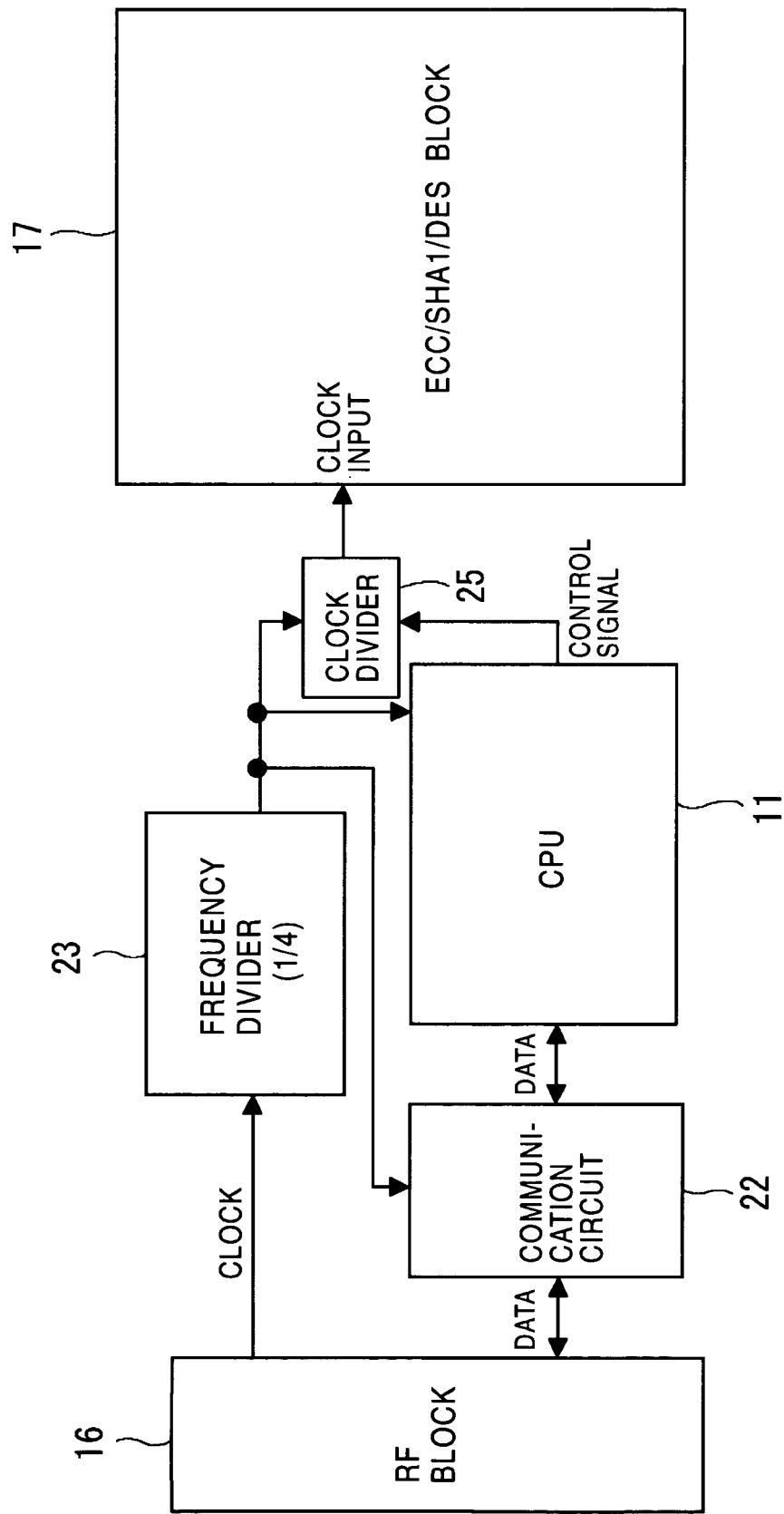
FIG. 8 is a block diagram of the non-contact IC card in which a clock divider is used to change the operation frequency.

In the non-contact IC card 1, the CPU 11 need not include the clock gear 21; the operation frequency of the encryption block 17 may be selected using any component other than the clock gear 21. As shown in FIG. 7, the non-contact IC card 1 may include an enable signal generation circuit 24. In the non-contact IC card 1 shown in FIG. 7, the division ratio of the operation frequency is input, as is, to the encryption block 17 from a frequency divider 23, and only the duty factor of an enable signal is changed by the enable signal generation circuit 24 based on control signals from the CPU 11, which sends service codes. Alternatively, as shown in FIG. 8, the non-contact IC card 1 may include a clock divider 25. In FIG. 8, the clock divider 25 receives control signals from the CPU 11, which sends service codes, and inputs the operation frequencies corresponding to the control signals to the encryption block 17. In the non-contact IC card 1 shown in FIG. 8, varying operation frequencies are input to the encryption block 17. The non-contact IC card 1 having the structure shown in FIGS. 7 and 8 also achieves stable operation of the respective blocks and reduces the power consumption.

In the non-contact IC card 1, therefore, hardware performing various operations is shared, particularly, time-shared, and the operations are performed at different operation frequencies. The shared hardware configuration reduces the circuit size of the encryption unit and also reduces the power consumption. Since the time-shared processing allows the operations to be performed at different operation frequencies, the power consumption can further be reduced. Thus, even if the non-contact IC card employs a public key encryption algorithm to ensure a sufficient communication distance, the non-contact IC card 1 can supply more power to a communication mechanism with a reader/writer. The non-contact IC card 1 easily realizes a two-way card using both a common key encryption algorithm and a public key encryption algorithm, and is used for a variety of services using the two encryption algorithms.

In the illustrated embodiment, the ECC technique is used as a public key encryption algorithm. However, the present invention is not limited thereto, and any other public key encryption technique, such as RSA, may be used.

In the illustrated embodiment, the SHA-1 technique is used as a hash function algorithm. However, the present invention may also be easily applied to any other hash function algorithm, such as MD5 (Message Digest 5).

In the illustrated embodiment, the DES technique, which is a common key encryption algorithm, is used as a random number generation technique for use in key generation of the encryption process. However, the present invention is not limited thereto, and any other random number generation technique may be used.

The illustrated structure of the present invention is merely an example, and a variety of modifications and variations may be made without departing from the spirit and scope of the present invention.

What is claimed is:

1. A non-contact IC card for communicating data with a reader/writer in a contactless manner, said non-contact IC card comprising:
encryption means having a public key encryption processor for performing a public key encryption operation, and a common key encryption processor for performing a common key encryption operation; and
frequency control means for changing an operation frequency of the non-contact IC card so that communication with the reader/writer and the encryption operations performed by the encryption means are carried out at different operation frequencies,
wherein hardware of the encryption means which is not required for the public key encryption operation is not operated during the public key encryption operation, and hardware of the encryption means which is not required for the common key encryption operation is not operated during the common key encryption operation.

2. A non-contact IC card according to claim 1, wherein a hardware unit having an identical function is shared between the public key encryption processor and the common key encryption processor, and the shared hardware unit is switched in a time-shared manner according to the operation mode.

3. A non-contact IC card according to claim 1, wherein a clock gear is used to change the operation frequency.

4. A non-contact IC card according to claim 1, wherein a frequency divider is used to change the operation frequency.

5. A non-contact IC card according to claim 1, wherein a duty factor of an enable signal is controlled to change the operation frequency.

6. A non-contact IC card according to claim 1, wherein the operation frequency is changed based on a control signal from the reader/writer.

7. A non-contact IC card configured for communicating data with a reader/writer in a contactless manner, said non-contact IC card comprising:
an encryptor having a public key encryption processor configured to perform a public key encryption operation, and a common key encryption processor configured to perform a common key encryption operation; and
a frequency controller configured to change an operation frequency of the non-contact IC card so that communication with the reader/writer and the encryption operations performed by the encryptor are carried out at different operation frequencies,
wherein hardware of the encryptor which is not required for the public key encryption operation is configured to not operate during the public key encryption operation, and
hardware of the encryptor which is not required for the common key encryption operation is configured to not operate during the common key encryption operation.

8. A non-contact IC card according to claim 7, wherein a hardware unit having an identical function is configured to be shared between the public key encryption processor and the common key encryption processor, and the shared hardware unit is configured to be switched in a time-shared manner according to the operation mode.

9. A non-contact IC card according to claim 7, wherein a clock gear is used to change the operation frequency.

10. A non-contact IC card according to claim 7, wherein a frequency divider is used to change the operation frequency.

11. A non-contact IC card according to claim 7, wherein a duty factor of an enable signal is controlled to change the operation frequency.

12. A non-contact IC card according to claim 7, wherein the operation frequency is changed based on a control signal from the reader/writer.

* * * * *